US011513213B2

(12) United States Patent
Roger et al.

(10) Patent No.: US 11,513,213 B2
(45) Date of Patent: Nov. 29, 2022

(54) PROCESSING RADAR SIGNALS

(71) Applicant: Infineon Technologies AG, Neubiberg (DE)

(72) Inventors: Andre Roger, Munich (DE); Farhan Bin Khalid, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 293 days.

(21) Appl. No.: 16/351,169

(22) Filed: Mar. 12, 2019

(65) Prior Publication Data
US 2019/0285725 A1 Sep. 19, 2019

(30) Foreign Application Priority Data

Mar. 14, 2018 (DE) .......................... 102018105875.6

(51) Int. Cl.
| | |
|---|---|
| *G01S 13/93* | (2020.01) |
| *G01S 7/35* | (2006.01) |
| *G01S 13/931* | (2020.01) |
| *G01S 13/58* | (2006.01) |
| *G01S 7/03* | (2006.01) |
| *G01S 13/524* | (2006.01) |
| *G01S 7/02* | (2006.01) |

(52) U.S. Cl.
CPC ............ *G01S 13/931* (2013.01); *G01S 7/023* (2013.01); *G01S 7/0232* (2021.05); *G01S 7/0235* (2021.05); *G01S 7/032* (2013.01); *G01S 7/352* (2013.01); *G01S 13/5246* (2013.01); *G01S 13/584* (2013.01); *G01S 7/356* (2021.05)

(58) Field of Classification Search
CPC ...... G01S 7/352; G01S 13/584; G01S 13/931; G01S 7/032; G01S 13/5246; G01S 2007/356; G01S 7/023
USPC ......................................................... 342/70
See application file for complete search history.

(56) References Cited

U.S. PATENT DOCUMENTS

| | | | | |
|---|---|---|---|---|
| 4,743,910 A | * | 5/1988 | Hill ........................ | G01S 13/584 342/159 |
| 5,008,678 A | * | 4/1991 | Herman ................. | G01S 13/87 342/158 |
| 9,140,788 B2 | * | 9/2015 | Kuehnle ................ | G01S 7/411 |
| 9,157,985 B1 | * | 10/2015 | Tardif .................... | G01S 7/021 |

(Continued)

FOREIGN PATENT DOCUMENTS

| | | |
|---|---|---|
| DE | 3787015 T2 | 3/1994 |
| DE | 102012209870 A1 | 12/2013 |
| JP | 2000227471 A * | 8/2000 |

OTHER PUBLICATIONS

Written Opinion from German Patent Office on corresponding EP102018105875.6, dated Mar. 8, 2019 (Year: 2019).*

(Continued)

*Primary Examiner* — Erin F Heard
*Assistant Examiner* — Helena H Seraydaryan
(74) *Attorney, Agent, or Firm* — Harrity & Harrity, LLP

(57) ABSTRACT

A method for processing a radar signal is provided. The method may include receiving chirps of a radar signal, sampling the radar signal, dividing the samples that correspond to the chirp of the radar signal into at least two virtual chirps, and processing the radar signal based on the at least two virtual chirps. Also, a corresponding device is provided.

21 Claims, 12 Drawing Sheets

(56) References Cited

U.S. PATENT DOCUMENTS

2008/0165833 A1* 7/2008 Lee .................... H04L 25/0202
375/139
2013/0335260 A1* 12/2013 Kuehnle ................ G01S 7/411
342/70

OTHER PUBLICATIONS

Wikipedia, "Constant false alarm rate", retrieved online at http://en.wikipedia.org/wiki/Constant_false_alarm_rate, Sep. 4, 2017, 2 pages.

* cited by examiner

PROCESSING RADAR SIGNALS

RELATED APPLICATION

This application claims priority under 35 U.S.C. § 119 to German Patent Application No. 102018105875.6, filed on Mar. 14, 2018, the contents of which are incorporated by reference herein in their entirety.

TECHNICAL FIELD

Implementations described herein relate to radar applications and, in particular, to an efficient way to process radar signals obtained by at least one radar sensor, e.g., via at least one antenna. Processing radar signals in this regard refers to radar signals received by a sensor or an antenna.

BACKGROUND

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate.

CFAR may be used as one approach to select FFT peaks, e.g., by comparing such peaks with predefined thresholds.

There exist known solutions for a dual-mode radar system that uses different antennas, one antenna set for each mode. The known approach requires a second acquisition period to deliver the additional mode. This extends the duration until a target can be detected by the radar system.

SUMMARY

The problem to be solved is to overcome the disadvantage stated above and in particular to provide a solution to efficiently process signals in a radar system that may eventually lead to an early target recognition.

This problem is solved according to the features of the independent claims. Further implementations result from the depending claims.

The examples suggested herein may in particular be based on at least one of the following solutions. In particular, combinations of the following features could be utilized in order to reach a desired result. The features of the method could be combined with any feature(s) of the device, apparatus or system or vice versa.

In some implementations, a method for processing a radar signal may be provided, the method comprising:
  receiving chirps of a radar signal,
  sampling the radar signal,
  dividing the samples that correspond to the chirp of the radar signal into at least two virtual chirps,
  processing the radar signal based on the at least two virtual chirps.

The chirps of the radar signal are ramps of an RF signal that is received via at least one antenna of the radar system. The chirps of the radar signal are transformed into an intermediate frequency, e.g., by mixing the received signal with a LO signal from the transmitter thereby down-converting the received signal to an intermediate frequency IF.

The IF is then sampled, wherein a number of samples may correspond to a single chirp of the received radar signal. It is noted that the samples may be taken for the duration of the single chirp or for less than the duration of the single chirp (i.e. some offset may be added at the beginning of the chirp).

The processing of the radar signals may be done independently from each other.

Examples described herein in particular utilize a new chirp concept. For example, at least two virtual chirps are derived from a single physical chirp thereby increasing the number of chirps per time interval that can be subject for further processing.

The solution presented allows using a single acquisition (the sampled radar signal) to be treated as several (e.g., two) separate acquisitions coming from two different (e.g., separated) virtual chirps.

The two sets of virtual chirps correspond to more than one acquisition. Hence, the reaction time of a radar system is improved, i.e. the radar system is able to react faster. The shortened reaction time enables reducing the probability of an object not being detected and/or the probability of a false detection.

This solution copes with a single physical acquisition using, e.g., a single radar transmitter and receiver. However, several physical acquisitions can be used in combination with the solution described herein. For example, for each physical acquisition, at least two sets of virtual chirps may be determined and used for further processing of the radar signals.

The solution described herein may be used in radar systems that may in particular be arranged in vehicles.

According to some implementations, the at least two virtual chirps are equally spread across the time of the chirp of the sampled radar signal.

The phrase "chirp of the sampled radars signal" thus refers to the chirp that is associated with the received, down-converted and sampled RF ramps of the radar signal. The chirp of the sampled radar signal may in particular define a duration that is determined by an individual chirp of the received radar signal. This duration corresponds to a predetermined number of samples. These samples can be split into groups to determine the virtual chirps as explained herein.

According to some implementation,
a first virtual chirp corresponds to a first start and first stop frequency,
a second virtual chirp corresponds to a second start and second stop frequency,
first and second start frequency are different and first and second stop frequency are different.

According to some implementations, the at least two virtual chirps are not equally spread across the time of the chirp of the sampled radar signal.

According to some implementations,
each chirp of the sampled radar signal is divided into two virtual chirps,
each virtual chirp lasts for less than 50% or for up to 50% of the time of the chirp of the sampled radar signal.

According to some implementations, a time interval is provided between the two virtual chirps.

According to some implementations, an interference mitigation is conducted prior to the processing of the radar signals.

The interference mitigation may be conducted on the entire set of samples or on each portion of the samples.

According to some implementations,
in a first mode the radar signal is processed based on the chirps of the radar signal,
in a second mode the radar signal is processed based on the at least two virtual chirps.

According to some implementations, the first mode and the second mode may be selected subsequently or in parallel.

According to some implementations, the first mode and the second mode may process radar signals that are stored in a commonly accessibly memory.

For example, the memory may be a data cube, or it may utilize a data cube.

According to some implementations, the processing the radar signals comprises at least one of the following:
conducting a FFT,
conducting an iFFT,
conducting a CFAR.

The FFT may be a first, second or third stage FFT.

According to some implementations, processing the radar signal based on the at least two virtual chirps comprises for at least one of the virtual chirps:
zero-padding the virtual chirps to enlarge the number of values.

According to some implementations, processing the radar signal based on the at least two virtual chirps comprises for at least one of the virtual chirps:
summing up pairs of bins in the complex domain.

This may in particular be done after a first stage FFT and/or a second stage FFT.

According to some implementations, processing the radar signal based on the at least two virtual chirps comprises for at least one of the virtual chirps:
performing a FFT to obtain a first range-doppler map which is based only on the samples of the first virtual chirp,
performing a FFT to obtain a second range-doppler map which is based only on the samples of the second virtual chirp.

Each virtual chirp may in particular be processed individually similar to the usual processing. Hence, a first virtual chirp may be Fourier-transformed to obtain a first range-doppler map which is based only on the samples of the first virtual chirp and the second virtual chirp may be Fourier-transformed to obtain a second range-doppler map based only on the samples of the second virtual chirp.

According to some implementations, a radar device is provided, the radar device comprising
a receiver, which is arranged for receiving chirps of a radar signal via an antenna,
a processing unit, which is arranged for
sampling the radar signal,
dividing the samples that correspond to the chirp of the radar signal into at least two virtual chirps,
processing the at least two virtual chirps.

According to some implementations, the processing unit is arranged for triggering a predetermined action if processing the radar signal fulfills a predetermined condition.

The solutions described herein allow for a high degree of drive automation. The higher acquisition rate due to the virtual chirps allows for faster processing of radar signals that enables fast reactions, e.g., automatic emergency breaking/stopping and crash protection at an increased level of efficiency.

According to some implementations, the receiver is arranged to enable independent virtual chirps by having redundant hardware resources, wherein at least one hardware resource is activated only during one part of the virtual chirp.

For example, a first hardware resource is active during a first virtual chirp and a second hardware resource is active during a second virtual chirp.

According to some implementations, the radar device is integrated on a single chip, in particular on a MMIC.

It is noted that the radar device may also comprise several receivers and in particular at least one transmitter. The device may also comprise at least one combined transmitter and receiver.

According to some implementations, the radar device further comprises a transmitter, wherein a combination of the receiver and the transmitter is arranged to enable independent virtual chirps by having redundant hardware resources, wherein at least one hardware resource is activated only during one part of the virtual chirp.

The device, in particular the MMIC may thus be arranged to enable independent virtual chirps, wherein computations are modified to increase independencies between the data that are based on processing the respective virtual chirps.

Also, vehicle is suggested comprising at least one radar system as described herein.

Further, a non-transitory computer program product is provided, which is directly loadable into a memory of a digital processing device, comprising software code portions for performing the operations of the method as described herein.

BRIEF DESCRIPTION OF THE FIGURES

Implementations are shown and illustrated with reference to the drawings. The drawings serve to illustrate the basic principle, so that only aspects necessary for understanding the basic principle are illustrated. The drawings are not to scale. In the drawings, the same reference characters denote like features.

DESCRIPTION

Examples described herein in particular refer to multi-mode radar systems (e.g., a dual-mode radar system) that may in particular enable a faster reaction time.

It is a major motivation to reduce the time required for an acquisition period of the radar system, i.e. the time until the signals from the radar sensors are processed such that at least one target can be identified by the radar system. This would reduce the reaction time of the radar system or of any control system using this radar system.

At least one such radar system may be used in a vehicle, for example in a car. Hence, the vehicle is able to determine a target at an earlier time, which significantly increases the benefit and the utilization of the radar system.

The examples described herein beneficially achieve such faster reaction time without having to reduce a chirp period of the radar signal, hence avoiding a higher sampling rate that would substantially increase the costs of the radar system (due to more complex MMIC (monolithic microwave integrated circuit) and larger memories which would become necessary to store more chirps in order to maintain a predetermined Doppler resolution).

The solutions described herein can be used, e.g., for high-resolution, long-range radar systems that allow for a high degree of drive automation. The higher acquisition rate due to the virtual chirps allows for faster processing of radar signals that enables fast reactions, e.g., automatic emergency breaking/stopping and crash protection at an increased level of efficiency.

The reaction time of a radar-based system (i.e. a radar system or a system utilizing the radar system) may be based on

- a probability that an actual target is not detected; and
- a probability that a target is detected, where there is no actual target (a so-called false detection or false positive).

Both probabilities should be as low as possible to ensure a good performance of the radar system. The probabilities can be reduced by increasing the number of acquisitions per time. In other words, the lower number of acquisitions per time unit, the lower the reaction time of the radar-based system.

It is noted that the radar system described herein may be used in combination with at least one other radar system and/or at least one camera system to supply information for a combined processing unit, e.g., a safety processor of a vehicle.

Examples described herein in particular utilize a new chirp concept. For example, at least two virtual chirps are derived from a single physical chirp thereby increasing the number of chirps per time interval that can be subject for further processing.

Figure 1A:
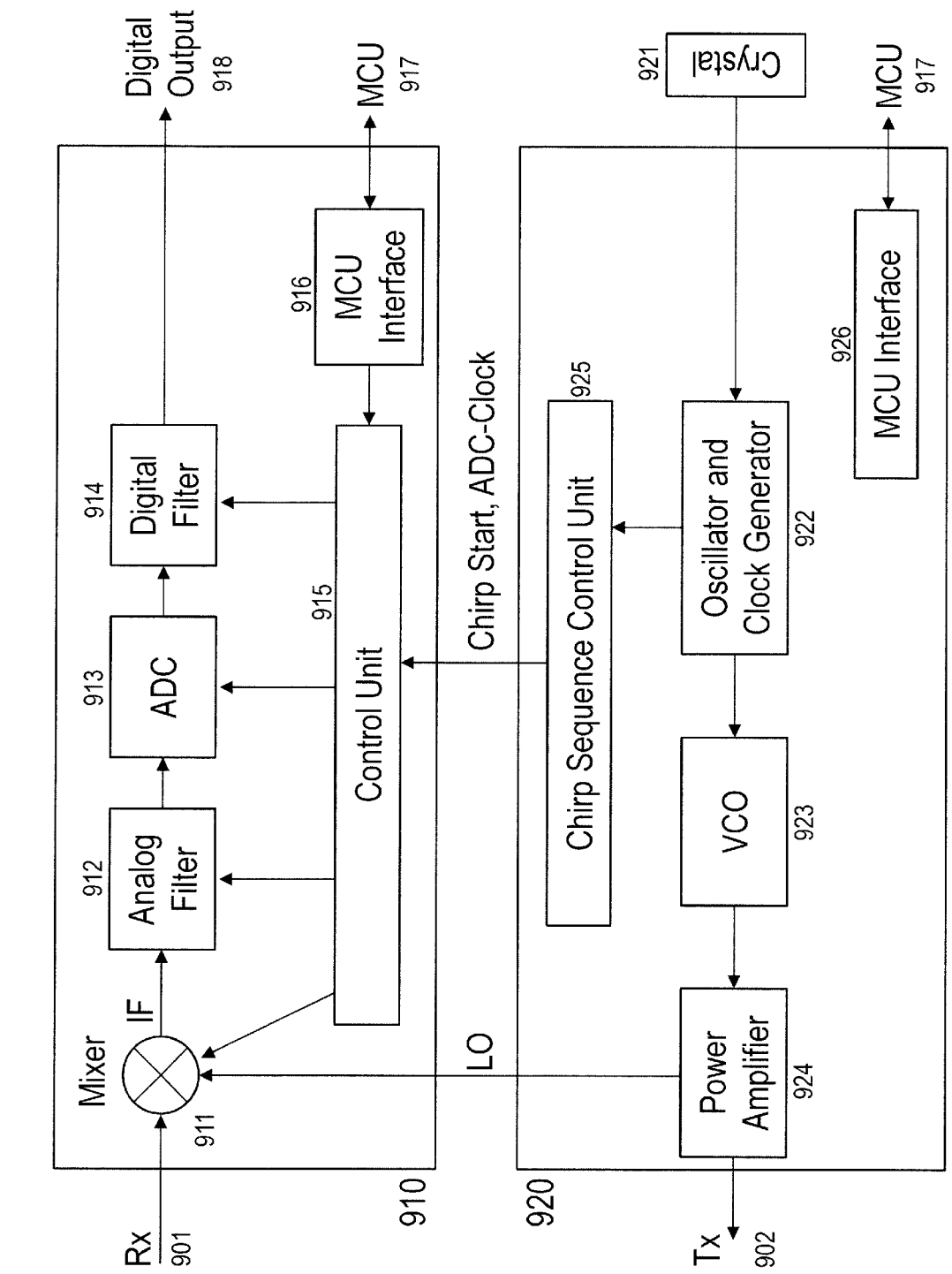
FIG. 1A shows a schematic structure of a transmitter and a receiver of a radar system.

FIG. 1A shows a schematic structure of a transmitter 920 and a receiver 910 of a radar system.

The receiver 910 comprises a mixer 911, an analog filter 912, an analog-to-digital converter (ADC) 913, a digital filter 914, a control unit 915 and an MCU interface 916 (MCU: microcontroller control unit).

A received signal RX 901 is (via an antenna, not shown) fed to the mixer 911. The mixer 911 is also be supplied with a local oscillator signal LO (from the transmitter 920); at its output, the mixer 911 supplies an intermediate frequency signal IF to the analog filter 912. The output of the analog filter 912 is connected to the input of the ADC 913 and the output of the ADC 913 is connected to the input of the digital filter 914. Hence, the intermediate frequency signal IF is filtered by the analog filter 912, then the filtered analog signal is converted into a digital signal by the ADC 913 and the digitally filtered signal is supplied as a digital output 918 for further processing.

An MCU 917 supplies a signal to the MCU interface 916, which further conveys this signal to the control unit 915. The control unit is arranged to control or configure any of the following components: mixer 911, analog filter 912, ADC 913 and digital filter 914. The control unit 915 obtains a "chirp start" (indicating the start or any shift of the start of the chirp) signal and an "ADC-clock" signal (i.e. the clock signal for the ADC 913) from the transmitter 920.

In the example shown in FIG. 1A, the transmitter 920 comprises an oscillator and clock generator 922, a voltage-controlled-oscillator (VCO) 923, a power amplifier 924, a chirp sequence control unit 925 and an MCU interface 926.

A crystal 921 (which in this example is located externally to the transmitter 920, but may also be part of the transmitter 920) is used by the oscillator and clock generator 922 to generate any clock signals required. For example, the oscillator and clock generator 922 supplies timing and clock signals to the chirp sequence control unit 925, which based on these signals determined the "chirp start" signal and the "ADC-clock" signal and conveys it toward the control unit 915 of the receiver 910.

Also, the oscillator and clock generator 922 feeds the oscillator signal to the VCO 923. The VCO 923 is used to drive the power amplifier 924 thereby generating the transmitted signal TX 902 (which is then conveyed via an antenna, which is not shown in FIG. 1A). Also, the power amplifier supplies the LO signal to the mixer 911 of the receiver 910.

Hence, according to the FMCW radar principle, the instantaneous transmit signal Tx is multiplied/mixed with the received signal Rx. The analog filter 912 may be a lowpass filter (LPF) to remove unwanted frequencies originating from the mixing process. The IF contains information about the distance to the surrounding objects of the radar. Each object reflection yields a sinusoidal, whose frequency is proportional to the object distance.

The IF signals may be analyzed across several ramps. The corresponding raw data (samples from the ADC 913) may be stored in a memory. For further analysis of the raw data, a fast Fourier transform (FFT) can be used. A first FFT (the so-called range FFT) is used to determine the contained frequencies in the radar IF signals, one for each of the recorded ramps. A second FFT then yields the range Doppler map, which contains information about the velocity and the distance to surrounding objects.

Figure 1B:
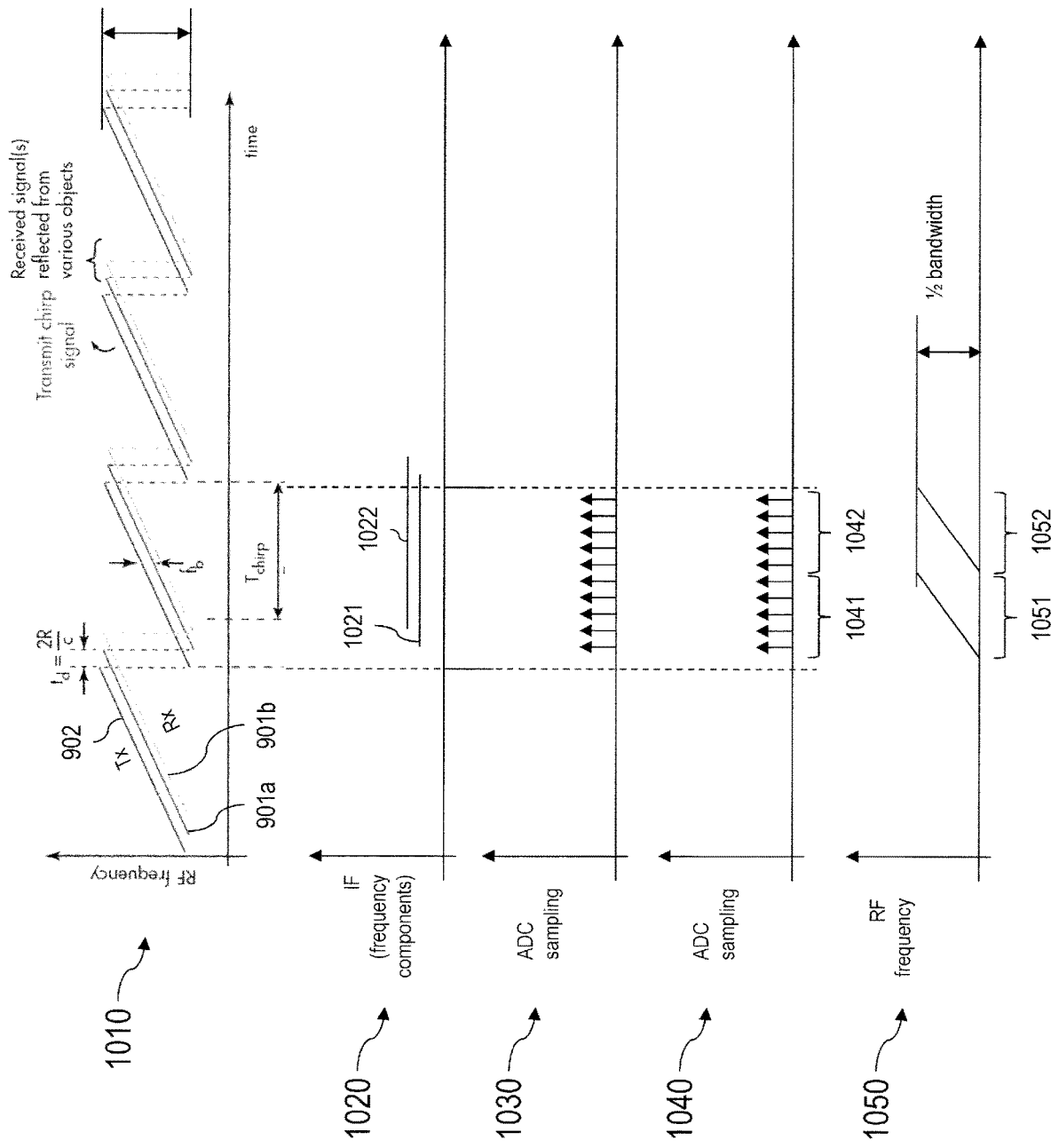
FIG. 1B shows a diagram visualizing the transmitted and the received signals as well as sampling and compiling the chirps.

FIG. 1B shows an example diagram visualizing the transmitted and received signals as well as the sampling.

A diagram 1010 shows various radio-frequencies over time. The transmitted signal 902 is emitted. Due to reflections from various objects, several signals 901a, 901b are received. In this example, the reflections of received signals 901a, 901b are obtained as different received signals 901 as shown in FIG. 1A. The transmitted signals 902 as well as the received signals 901a, 902 have the form of chirps, i.e. repetitive patterns of frequency-up-shifts. It is to be understood that in other implementations frequency down-shifted chirps can be used instead of frequency-up shifted chirps.

A delay between the transmitted signal 902 and the received signal 901a amounts to $$t_d = \frac{2 \cdot R}{c},$$

wherein R is the range toward the object and c is the velocity of light.

Usually, a chirp starts after the received signal 901b has returned (optionally with some time offset). This is indicated by the chirp duration $T_{chirp}$ in FIG. 1B.

A beat frequency $f_b$ indicates an intermediate frequency that is specific for a particular object or range.

A diagram 1020 shows frequency components of the intermediate frequency IF over time, wherein an IF 1021 is associated with the received signal 901a and an IF 1022 is associated with the received signal 901b.

A diagram 1030 shows ADC samples after sampling conducted by the ADC 913.

A diagram 1040 then shows a virtualization of the ADC samples of diagram 1030 into two different virtual portions 1041 and 1042.

A diagram 1050 shows virtual chirps 1051 and 1052, wherein the virtual chirp 1051 can be associated with the portion 1041 of ADC samples and wherein the virtual chirp 1052 can be associated with the portion 1042 of ADC samples.

Figure 1C:
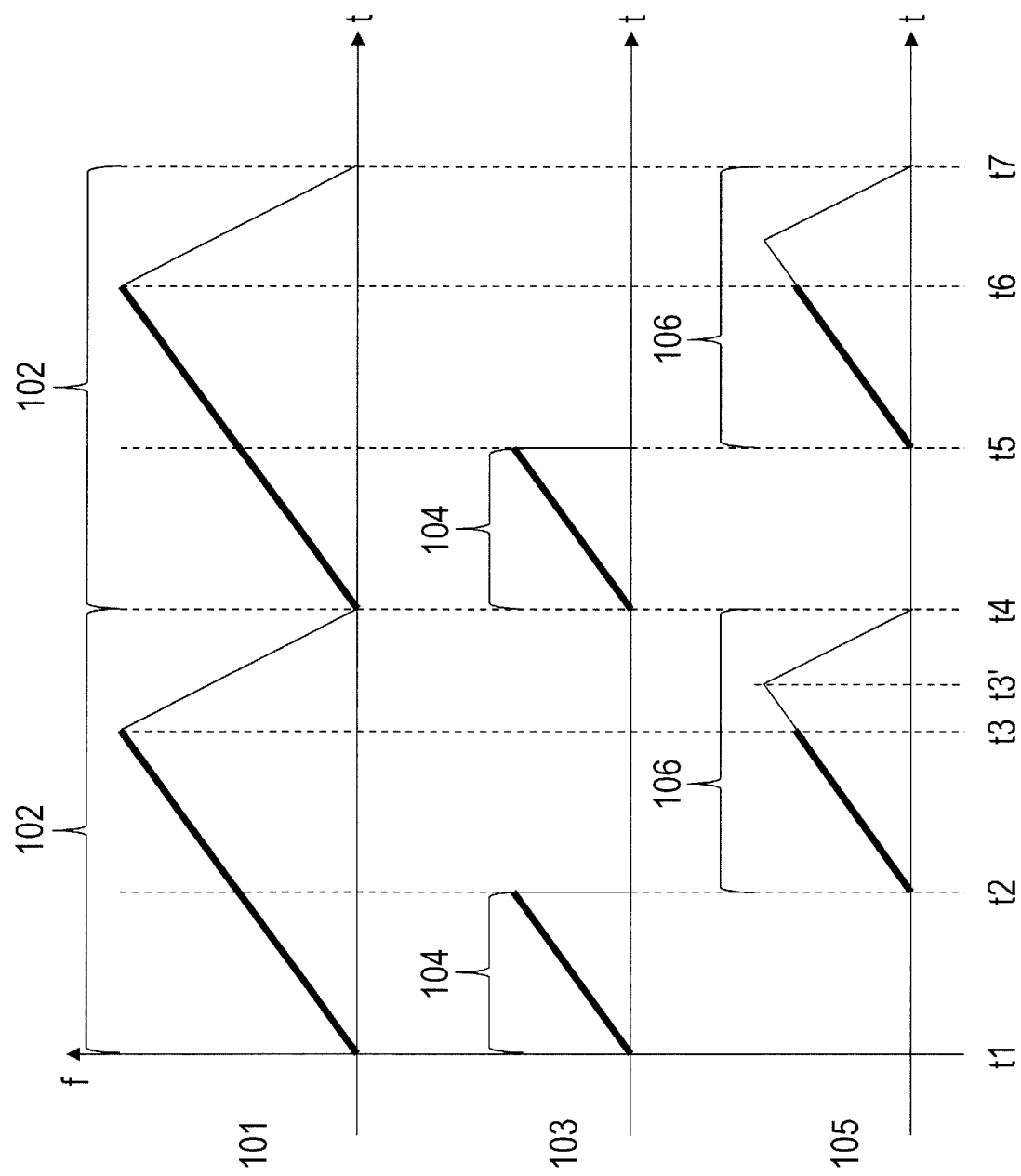
FIG. 1C shows a diagram comprising a signal, which contains chirps of a sampled (original) signal as well as virtual chirps derived thereof.

Hereinafter, FIG. 1C to FIG. 5 show AD-converted samples of an IF signal which correspond in time to the time interval of a virtual chirp (see, e.g., virtual chirps 104 shown in FIG. 1C as will be explained in more detail below). The virtual chirps may be grouped and processed as independent chirps each.

A physical chirp may in particular be based on an RF signal with a frequency up-shift or a frequency down-shift (also referred to as a ramp of frequencies). A "bin" may in particular be a result of an FFT processing of the samples of the chirp.

FIG. 1C shows a diagram comprising a signal 101, which contains several chirps 102, which are received at a receiver of a radar system. The x-axis of the diagram refers to the time t and the y-axis of the diagram refers to the frequency f.

As explained with regard to FIG. 1A, the chirp 102 is received at the receiver 910, conveyed to the mixer 911 thereby being mixed down with the LO signal to an IF signal. The IF signal is then filtered by the analog filter 912 and the filtered analog signal is analog-to-digital converted into samples (digital values). Usually, the down-converted samples corresponding to the rising portion of the chirp 102 is subject to further processing, e.g., conducting FFTs.

In the example presented herein, each chirp 102 of the signal 101 is virtually divided into at least two virtual chirps 104, 106. Each virtual chirps comprises a subset of the ADC samples resulting from a physical chirp.

To reflect the virtual dividing of the chirps, after determining AD-converting the IF signal, the data values corresponding to a single physical chirp are separated into two or more groups, i.e. two or more chirps. The frequency profiles (ramp characteristic) corresponding to the two virtual chirps 104 and 106 may in particular be frequency-shifted such that a start frequency of the virtual chirp 104 differs from a start frequency of the virtual chirp 106.

As described also below, the two virtual chirps 104 and 106 are further processed as two independent acquisitions. In other words, each virtual chirp 104 and 106 is processed in the same manner as a conventional chirp. For example, samples of the virtual chirps 104 may be arranged in one column (bin) and a first FFT processing (range FFT) may be provided over the samples of the virtual chirp 104. In other words, a FFT processing along a bin associated with the virtual chirps 104 may include only FFT processing of the sampled data of virtual chirp 104 (plus optional stuffing data as described later on). The FFT processing of the bin associated with the virtual chirp 104 may in particular not include sampling data from the virtual chirp 106, although the sampling data correspond to a same physical chirp.

A signal 103 shows a first set of virtual chirps 104 and a signal 105 shows a second set of virtual chirps 106. Hence, each of the signals 103 and 105 comprises several virtual chirps.

In the described implementation, the signal 103 comprises virtual chirps of a same first characteristic (e.g., first start and stop frequency for all chirps) and the signal 105 comprises virtual chirps of a same second characteristic (e.g., second start and stop frequency for all chirps).

The processing of the signals 103 and 105 provides a processing of twice as many chirps compared to the number of processed chirps in the signal 101.

It is noted that the virtual chirp 104 comprises a rising portion, which corresponds to the rising portion of the chirp 102 between points in time t1 and t2. It is further noted that typically a small portion of chirp samples corresponding to a small signal portion after the time t1 is typically discarded when processing the chirp 102 to allow for some nonlinearities to be neglected. Accordingly, when processing the virtual chirp 104, a small portion of the chirp samples corresponding to a small signal portion after the offset time t1 may be discarded and not used for the processing of the virtual chirp 104.

Further, the virtual chirp 106 comprises a rising portion between t2 and t3, which is based on the rising portion of the chirp 102. The virtual chirp 106 also comprises a falling portion (from t3' to t4), which is based on the fact that the chirp 102 also has a falling portion before the rising portion of the subsequent chirp 102 starts.

Hence, analog-to-digital converted samples (also referred to as ADC samples) of the chirp 102 that are collected during the time from t1 to t3 (see signal 101) are virtually separated into a first subset of ADC samples from t1 to t2 as signal 103 and a second subset of ADC samples from t2 to t3 as signal 105. It is noted that t1 to t7 refer to moments of time indicated on the x-axis of FIG. 1C. Also, after t4 the generation of the virtual signals 103 and 105 from the signal 101 is repeated for t5 to t7 accordingly.

In an example implementation, the first subset of ADC samples (signal 103) and the second subset of ADC samples (signal 105) may have approximately the same number of ADC samples, i.e.

$$t2-t1=t3-t2.$$

However, it is also an option that these subsets comprise a diverting number of ADC samples. It is further an option that more than two subsets are used. It is yet another option that the subsets together comprise all ADC samples of the signal 101.

The chirps of the signal 103 and the chirps of the signal 105 may have the same active duration and the same frequency shift (i.e. a difference between stop frequency and start frequency), but they may be sampled at different time instants so that they constitute independent acquisitions of the same scenery. The combination of the signals 103 and 105 results in twice the number of chirps compared to the signal 101, which allows for a faster determination of targets vs. false detections.

Hence, each combination of the chirps of the signals 103 and 105 can be regarded as a single acquisition. This reduces the probabilities that an actual target is not detected and that a target is detected, where there is actual no target.

Such separation of one physical acquisition as shown in signal 101 into two virtual acquisitions as depicted by signals 103 and 105 results in a reduced reaction time of the radar system (in the example shown, by a factor of about two).

Figure 2:
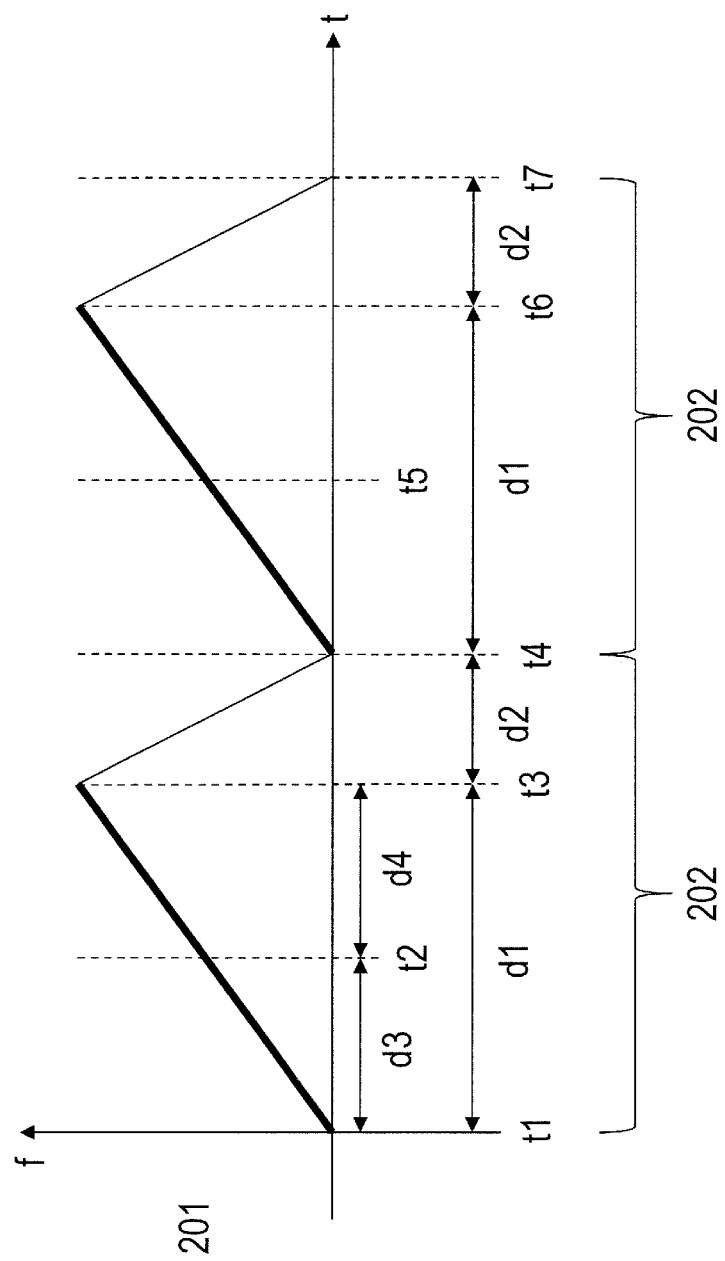
FIG. 2 shows a diagram comprising a signal with two original chirps and how the virtual chirps can be derived from each original chirp.

FIG. 2 shows a diagram comprising a signal 201 with two chirps 202. Each of the chirps 202 comprises a duration d1 and a duration d2, wherein the duration d1 indicates the rising ramp and the duration d2 indicates the time that is required before the rising ramp of a subsequent chirp 202.

The duration d1 is split into a duration d3 and a duration d4, wherein the duration d3 indicates a first portion of the rising ramp and the duration d4 indicates a second portion of the rising ramp, hence:

$$d1=d3+d4.$$

The duration d3 may in particular be as long as the duration d4. As an alternative, the duration d3 may be shorter or longer than the duration d4.

There are in particular two different examples to determine the virtual chirps (the first option refers to FIG. 2 and the second option refers to FIGS. 3 and 4):

The duration d3 is set equal to the duration d4, which is equal to the duration of d1/2. Hence, the rising ramp of the chirp 202 is virtualized in (substantially) equal portions. In other words, all sampled chirp data are either assigned to a virtual chirp.

The duration d3 is set equal to the duration d4, which is equal to the duration of (d1+2·d2)/2. This case allows for a time gap between the virtualized chirps.

Sampling of the duration d3 and the duration d4 results in two set of samples that might be processed independently from each other and that might be combined to enhance the quality of the results.

It is an option to collect all data during the duration d1, then split it into two data portions, one corresponding to the duration d3 and one corresponding to the duration d4.

Figure 3:
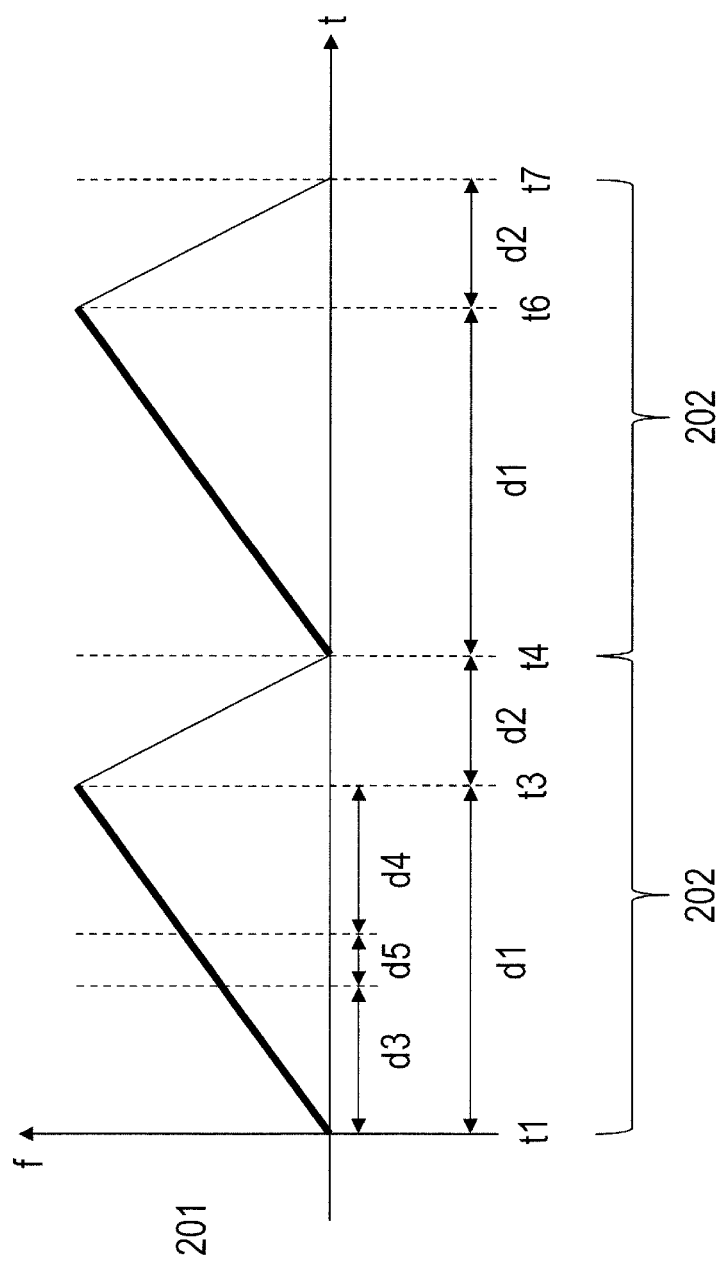
FIG. 3 shows an alternative diagram comprising a signal with two original chirps and how the virtual chirps can be derived from each original chirp.

FIG. 3 shows a diagram comprising the signal 201 with two chirps 202. Each of the chirps 202 is split into the duration d1 and the duration d2 as is shown in and explained with regard to FIG. 2 above.

The duration d1 is split into the duration d3, a duration d5 and the duration d4, wherein the duration d3 indicates the first portion of the rising ramp and the duration d4 indicates the second portion of the rising ramp and the duration d5 is a time interval between the duration d3 and the duration d4, hence:

$$d1=d3+d4+d5.$$

The duration d3 may in particular be as long as the duration d4. As an alternative, the duration d3 may be shorter or longer than the duration d4.

The duration d5 may be a time interval between the duration d3 and the duration d4. It may be chosen to be equal to the duration d2 such that it allows for a combined Doppler processing using a 2D-FFT across the range of bins based on the signals acquired during the durations d3 and d4. As indicated above:

$$d3=d4=(d1+2·d2)/2$$

As an option, the duration d2 may be (substantially) the same as the duration d5. It is also an option that the duration d5 is at least as long as the duration d2.

Sampling of the duration d3 and the duration d4 results in two set of samples that might be processed independently from each other and that might be combined to enhance the quality of the results.

It is an option to collect all data during the duration d1, then split it into two data portions, one corresponding to the duration d3 and one corresponding to the duration d4. In FIG. 3, the sampled chirp data in the time period d5 is not used in the virtual chirps.

Figure 4:
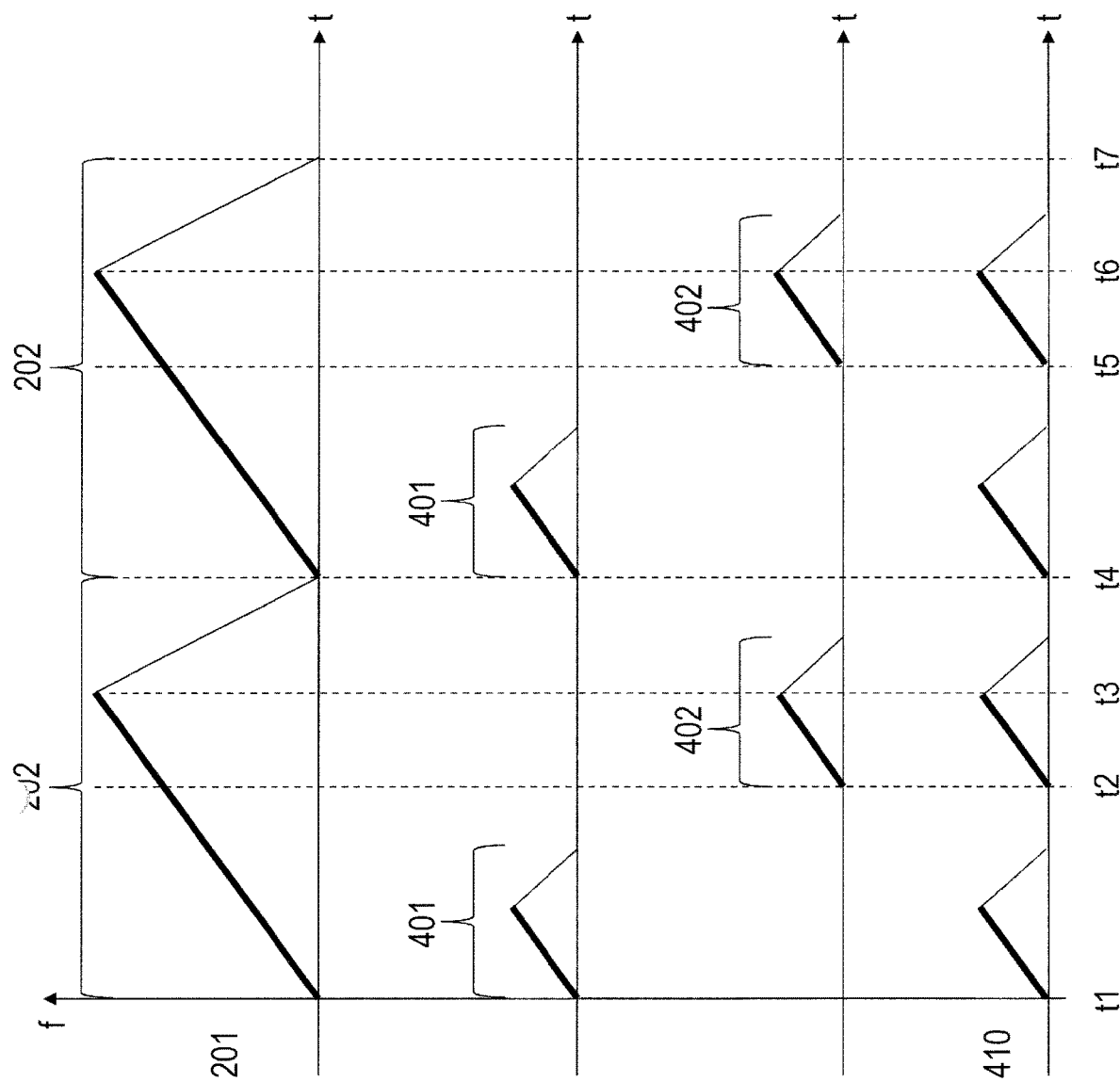
FIG. 4 shows an example of virtual chirps that are substantially equally spaced in time.

FIG. 4 shows an example of virtual chirps 401 and 402 that are substantially equally spaced in time. The virtual chirps 401 and 402 are based on the chirps 202 of the signal 201 (see above). A signal 410 shows a combination of the chirps 401 and 402.

The duration of each of the virtual chirps 401 and 402 is less than 50% of the duration of the chirp 202.

This example allows generating twice as many virtual chirps 401 and 402 per time compared to the chirp 202. The virtual chirps 401 and 402 may in particular be equally spaced in time. Hence, a Doppler frequency can be easily computed by FFT processing after range processing. The virtual chirps 401 and 402 can be processed separately, which results in a reduced reaction time of the system and it provides an increased robustness against interference.

As there are twice as many chirps 401 and 402 per time interval compared to the chirps 202, processing each chirp individually allows a faster determination of targets. Processing, however, the combined signal 410, the unambiguous Doppler frequency is increased.

Figure 5:
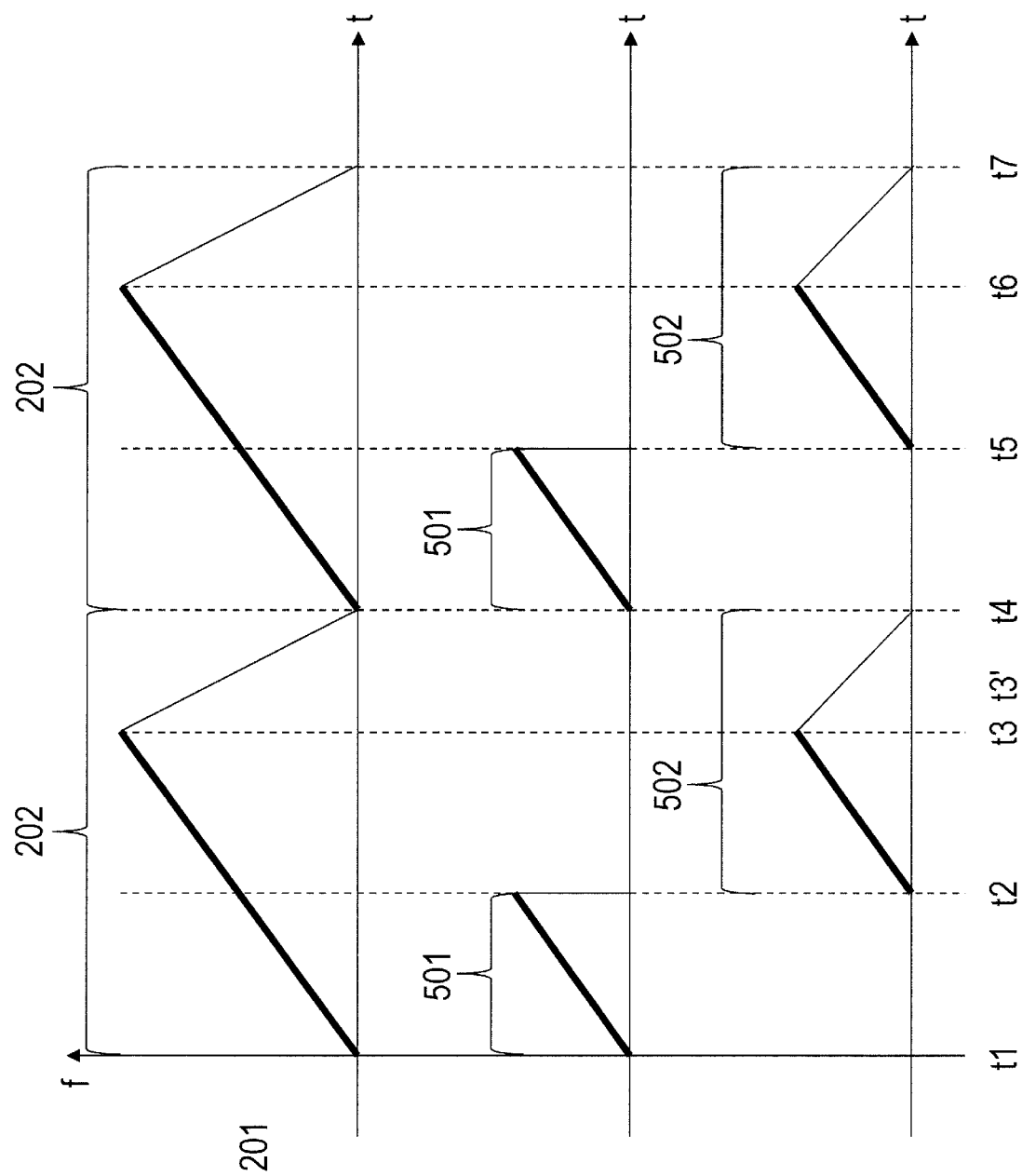
FIG. 5 shows an example of virtual chirps that are not equally spaced in time.

FIG. 5 shows an example of virtual chirps 501 and 502 that are not fully equally spaced in time (because t241 is different from t4-t2). The virtual chirps 501 and 502 are based on the chirps 202 of the signal 201.

Each of the duration of the virtual chirps 501 and 502 may amount up to 50% of the duration of the chirp 202.

This example allows generating twice as many chirps 501 and 502 per time of the chirp 202. The virtual chirps 501 and 502 can be processed individually (separately), which results in a reduced reaction time of the system and it provides an increased robustness against interference.

The virtual chirps 501 and 502 may be processed independently from each other. Plausibility checks may be conducted based on the virtual chirps 501 and 502. This increases the probability of detecting a target by the radar system and it reduces the probability of false detection, which overall results in a reduced thereby improved reaction time of the system. This may apply to the example shown in FIG. 4 accordingly.

Examples for Processing Virtual Chirps

The virtual chirps may be processed in various ways. Each virtual chirp represents a subset of data from the underlying physical chirp (also referred to as "base chirp"). With regard to the example shown in FIG. 4 the chirp 202 is virtualized into the chirps 401, 402 and with regard to the example shown in FIG. 5 the chirp 202 is virtualized into the chirps 501, 502.

In a first option, each subset of data is being processed such that the original size of the FFT for the underlying physical chirp can be utilized. For example, if the underlying physical chirp uses a FFT on 1024 samples (referred to as "1024-FFT"), this 1024-FFT is also used on each subset of data, although each subset of data may have less than half the number of samples (i.e. less than 512 samples). In such case, 0-padding is used to provide a sufficient number of samples for the 1024-FFT to be executed. For example, if the subset of data comprises 512 samples, a 0-value can be inserted after each value of the subset resulting in a total of 1024 values (with half the values being 0), which can be fed to the 1024-FFT. As a result, the full range (all 1024 samples) is used, but (because of the padded zeroes) at half the sensitivity.

A second option is based on this first option. The 1024-FFT results in 1024 bins. These bins are summed up in the complex domain (e.g., pairs of adjacent bins can be summed up) thereby increasing the sensitivity (according to the example above: by a factor of two) at the cost of reducing the range resolution (according to the example above: by a factor of two). Hence, globally, the original sensitivity may (substantially) be maintained (reduced by a factor of 2 due to padding and improved by a factor of 2 due to summation of adjacent pairs of bins).

Finally, a third option may introduce a down sampling (e.g., summing samples in pairs or multiple pairs) prior to the FFT. According to the 1024-FFT example, such down sampling may result in $\frac{1}{4}^{th}$ of the 1024 samples, i.e. in 256 samples. Four of these 256 samples are then fed to the 1024-FFT. This may maintain the sensitivity, but it reduces the range (according to the example to $\frac{1}{4}^{th}$). It is noted that a reduced may be acceptable for some use cases, e.g., a vehicle driving in the city.

Hence, having 50% of the samples means that the minimum range of the radar system is increased by the factor of 2 (because the minimum sampled frequency is increased by the factor of 2). In addition, having 50% of the samples means reducing the sensitivity over the entire range by a factor of two (because of the lesser number of samples).

Example Process Flow

Figure 6:
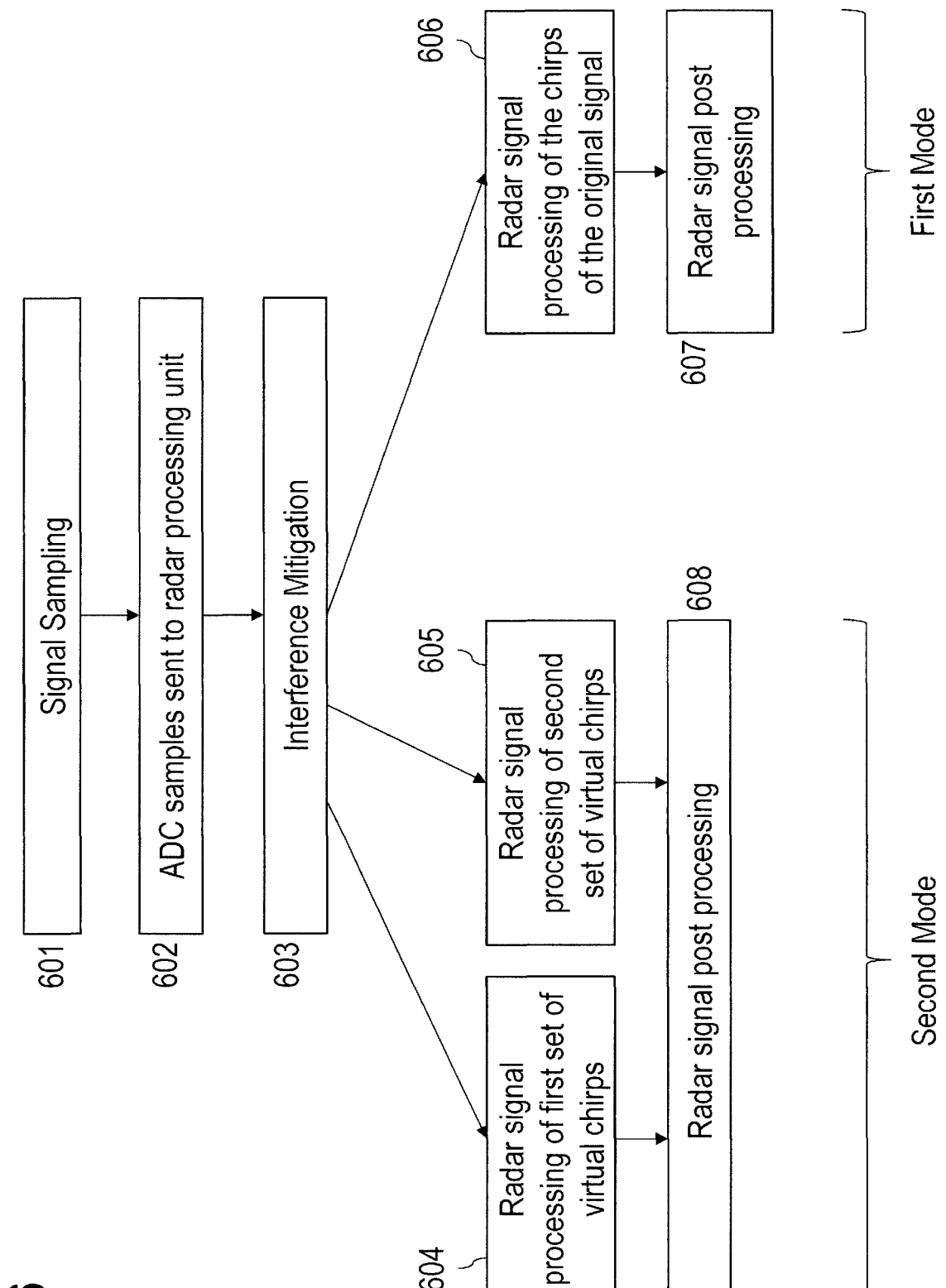
FIG. 6 shows a schematic flow diagram comprising operations of a process that utilizes virtual chirps.

FIG. 6 shows a schematic flow diagram comprising operations of a process that utilizes virtual chirps.

In a block 601, a receiving radar signal is sampled. Such sampling comprises converting an analog signal to a digital signal. In a block 602, the ADC samples are sent to a radar processing unit. In a block 603, an interference mitigation may be conducted. This block 603 may be optional.

In a block 604, radar signal processing of a first set of virtual chirps is conducted. This may involve a first 2D-FFT process, i.e. Range-FFT and/or Doppler-FFT on the sampled data corresponding to the first set of virtual chirps. The first set of virtual chirps may correspond to the virtual chirps 401 or to the virtual chirps 501.

In a block 605, radar signal processing of a second set of virtual chirps is conducted. This may involve a second 2D-FFT process, i.e. Range-FFT and/or Doppler-FFT on the sampled data corresponding to the second set of virtual chirps. The second set of virtual chirps may correspond to the virtual chirps 402 or to the virtual chirps 502.

Hence, the virtual chirps of different kinds (i.e. first set of virtual chirps, second set of virtual chirps) may each be processed on their own utilizing a 2D-FFT.

Subsequent to block 604 and 605, a radar signal post processing is conducted in a block 608. This block 608 may comprise a comparison of results and a processing of results as if the first set of virtual chirps and the second set of virtual chirps correspond to different acquisitions (i.e. would be based on different samplings).

The block 608 may comprise a tracker that is alternatively fed by (the outputs of) the block 604 and/or by (the outputs of) the 605, so that, by having twice as many input values, the tracker is able to reach two times faster the targeted probabilities of detection or non-detection.

In a block 606, radar signal processing of the received (original) signal is conducted. This may involve a 2D-FFT process. The received signal may correspond to the chirps 202.

Subsequent to block 606, a radar signal post processing is conducted in a block 607.

Hence, in a first mode, the received original chirps are processed in a block 606 and the results of this block 606 are postprocessed in a subsequent block 607. This may be beneficial for high-resolution processing purposes.

In a second mode, the virtual chirps are processed in blocks 604 and 605 and in the subsequent block 608 the results of the processing of blocks 604 and 605 are post-processed. This may be beneficial to reach results at a higher pace (allowing faster reaction time), but also at a lower resolution compared to the first mode.

Hence, in this example, the ADC samples can be processed as separate virtual chirps using a 2D FFT. In a first pass, the first mode is used to process the original chirps 202. In a second pass, the second mode is used to separately process the virtual chirps 401/501 and 402/502.

As the combination of virtual chirps 401 and 402 (501 and 502) appear twice as often as the original chirps 202 and as the signal sensitivity can be maintained using specific signal processing approaches, the probability of an erroneous non-detection and/or the probability of a false detection can be significantly reduced. Also, the reaction time of the radar system is reduced. All these advantages are achieved without having to change the physical acquisition. Hence, the virtual chirps enable better results without having to increase the actual physical sampling of the received radar signals.

For example, if there are twice as many (virtual) chirps, the reaction time of the radar system (which utilizes the number of chirps that appear twice as often) is reduced by about a factor of two.

As an advantage, existing interference mitigation concepts can be utilized in combination with the solutions described herein.

Example Use Case: Corner Radar

The radar system may comprise a corner radar. The corner radar is beneficial to detect a dangerous situation in the proximity of the vehicle. Examples for such dangerous situations for the own vehicle are a vehicle ahead that changes lanes from an adjacent lane towards the lane of the own vehicle;

a bike, vehicle, pedestrian or any other object entering a zone in the proximity of the own vehicle.

A fast reaction based on a close range detection is an advantage of the corner radar. The solution presented herein enable a significant time reduction amounting to, e.g., 100 ms.

If a vehicle enters a road because the driver did not follow a traffic sign, there is an immediate danger of a side crash. The same danger exists at intersections with blocked view. Here the corner radar of the entering car becomes crucial: At a speed of 50 km/h the vehicle covers 1.3 meters per second. If the radar system has a reduced response time, the system is earlier in a position to decide whether or not to initiate an emergency action (e.g., break or evasive maneuver), which increases the chances that there is enough time to avoid an accident or even to avoid a false reaction, because the situation may have mitigated itself a couple of milliseconds later if, e.g., the entering car will then have decelerated.

Alternative Process Flows

Figure 7:
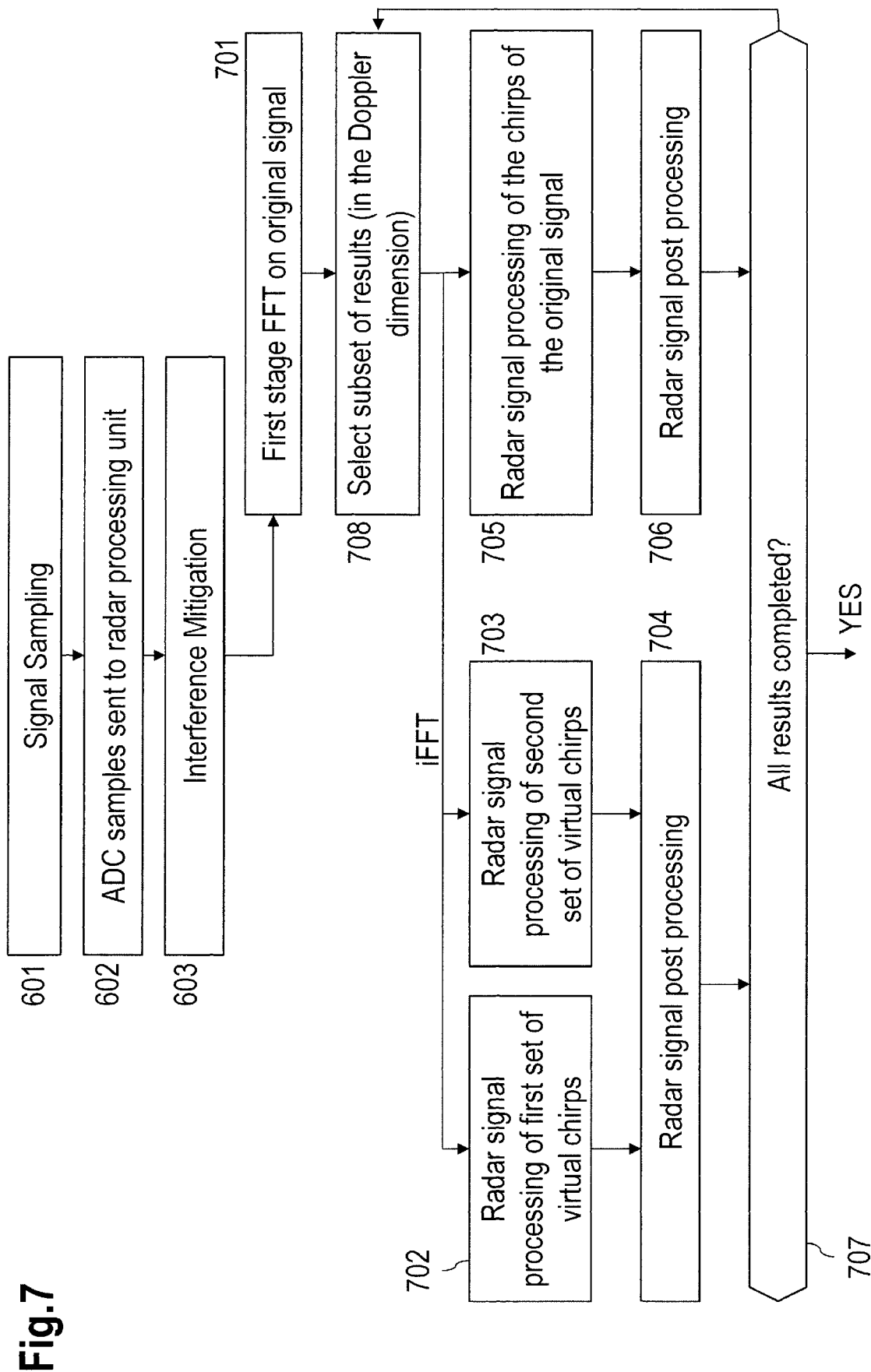
FIG. 7 shows an alternative schematic flow diagram comprising operations of a process that utilizes virtual chirps.

FIG. 7 shows an alternative schematic flow diagram comprising operations of a process that utilizes virtual chirps. This examples has the advantage of reduced memory requirements for storing results.

The blocks 601 to 603 correspond to the blocks shown in and explained with regard to FIG. 6.

Next to block 603 is a block 701 in which a first stage FFT is conducted on the received (original) signal (i.e. the chirps 202).

Next to block 701, in a block 708 a subset of results (in the Doppler dimension) is selected. The results selected in the block 708 are further conveyed to blocks 702, 703 and 705.

In the block 702, radar signal processing of a first set of virtual chirps is conducted. This may involve a 2D FFT process. The first set of virtual chirps may correspond to the virtual chirps 401 or to the virtual chirps 501.

In the block 703, radar signal processing of a second set of virtual chirps is conducted. This may involve a 2D FFT process. The second set of virtual chirps may correspond to the virtual chirps 402 or to the virtual chirps 502.

Subsequent to block 702 and 703, a radar signal post processing is conducted in a block 704. This block 704 may comprise a comparison of results and a processing of results as if the first set of virtual chirps and the second set of virtual chirps correspond to different acquisitions (i.e. would be based on different samplings).

Subsequent to block 704, in a block 707 it is determined whether all results are completed. In the affirmative, the processing is finished (see "YES"). If not all results are completed, it is branched off to block 708.

In the block 705, radar signal processing of the received (original) signal is conducted. This may involve a second stage FFT. Subsequent to block 705, a radar signal post processing is conducted in a block 706.

Subsequent to block 706 is block 707.

The blocks 702 to 704 are conducted per subset of a data cube, in particular by working on a predetermined slices in the Doppler dimension (as is indicated by block 708).

A radar data cube provides an intuitive way to represent radar processing as a function of space and time. The radar data cube may be perceived as a three-dimensional block with the radar returns of a single pulse represented along a first axis, returns from additional receiver elements along a second axis, and a collection of the returns from multiple pulses along a third axis (see, e.g., https://de.mathworks.com/company/newsletters/articles/building-and-processing-a-radar-data-cube.html).

This approach is efficient as there is no double memory required. Instead, a single memory (in which the data cube is stored) can be efficient1y utilized.

For example, the second stage FFT is processed only for a portion of the data cube. In such scenario, an inverse FFT (iFFT) can be conducted on the FFT results supplied by block 701, which are then conveyed to the blocks 702 and 703 thereby separating the first set of virtual chirps from the second set of virtual chirps, then processing the first stage FFT on the first set of virtual chirps and on the second set of virtual chirps in the blocks 702 and 703.

In other words, the blocks 702 and 703 may each first conduct an iFFT to undo the processing of block 701.

It is noted that the blocks 701, 705 and 706 may be associated with the first mode and that the blocks 702, 703 and 704 may be associated with the second mode.

Figure 8:
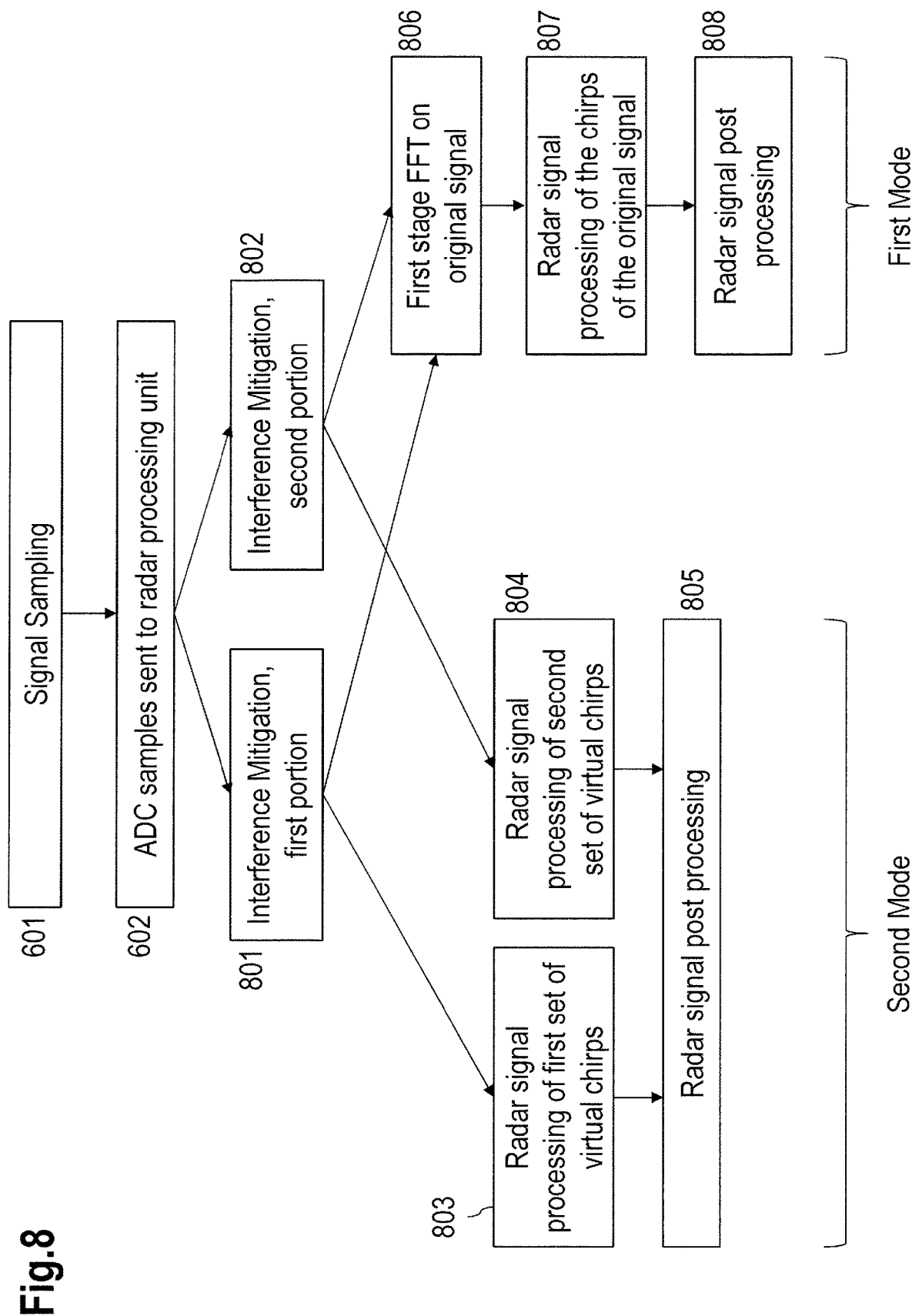
FIG. 8 shows yet an alternative schematic flow diagram comprising operations of a process that utilizes virtual chirps.

FIG. 8 shows yet an alternative schematic flow diagram comprising operations of a process that utilizes virtual chirps. This approach avoids a common cause of processing error between the two independent portions of the chirps.

The blocks 601 and 602 correspond to the blocks shown in and explained with regard to FIG. 6.

The interference mitigation, however is hand1ed in separate blocks 801 and 802. In block 801, interference mitigation is conducted for a first portion (e.g., first half) of the chirp 202, wherein the chirp 202 corresponds to the received (original) signal. In block 802, interference mitigation is conducted for a second portion (e.g., second half) of the chirp 202.

Next to block 801 is a block 803 and a block 806. Next to block 802 is a block 804 and the block 806.

In the block 803, radar signal processing of a first set of virtual chirps is conducted. This may involve a 2D FFT process. The first set of virtual chirps may correspond to the virtual chirps 401 or to the virtual chirps 501.

In the block 804, radar signal processing of a second set of virtual chirps is conducted. This may involve a 2D FFT process. The second set of virtual chirps may correspond to the virtual chirps 402 or to the virtual chirps 502.

Subsequent to block 803 and 804, a radar signal post processing is conducted in a block 805. This block 805 may comprise a comparison of results and a processing of results as if the first set of virtual chirps and the second set of virtual chirps correspond to different acquisitions (i.e. would be based on different samplings).

In block 806 a first stage FFT is conducted on the received (original) signal (i.e. the chirps 202). Next, in a block 807, radar signal processing of the received (original) signal is conducted. This may involve a second stage FFT. Subsequent to block 807, a radar signal post processing is conducted in a block 808.

The blocks 803 to 805 are conducted per subset of a data cube. Also, the blocks 807 and 808 may be conducted per subset of the data cube.

In this example, interference mitigation is divided in blocks 801 and 802 in order to have two independent computing operations so that potential common cause of computation error (by doing interference mitigation in a single operation) is avoided. A recombination of the two interference free parts after the blocks 801 and 802 is conducted in block 806 so that the complete signal is subject to filtering the interferences.

Enhanced MMIC Design

Figure 9:
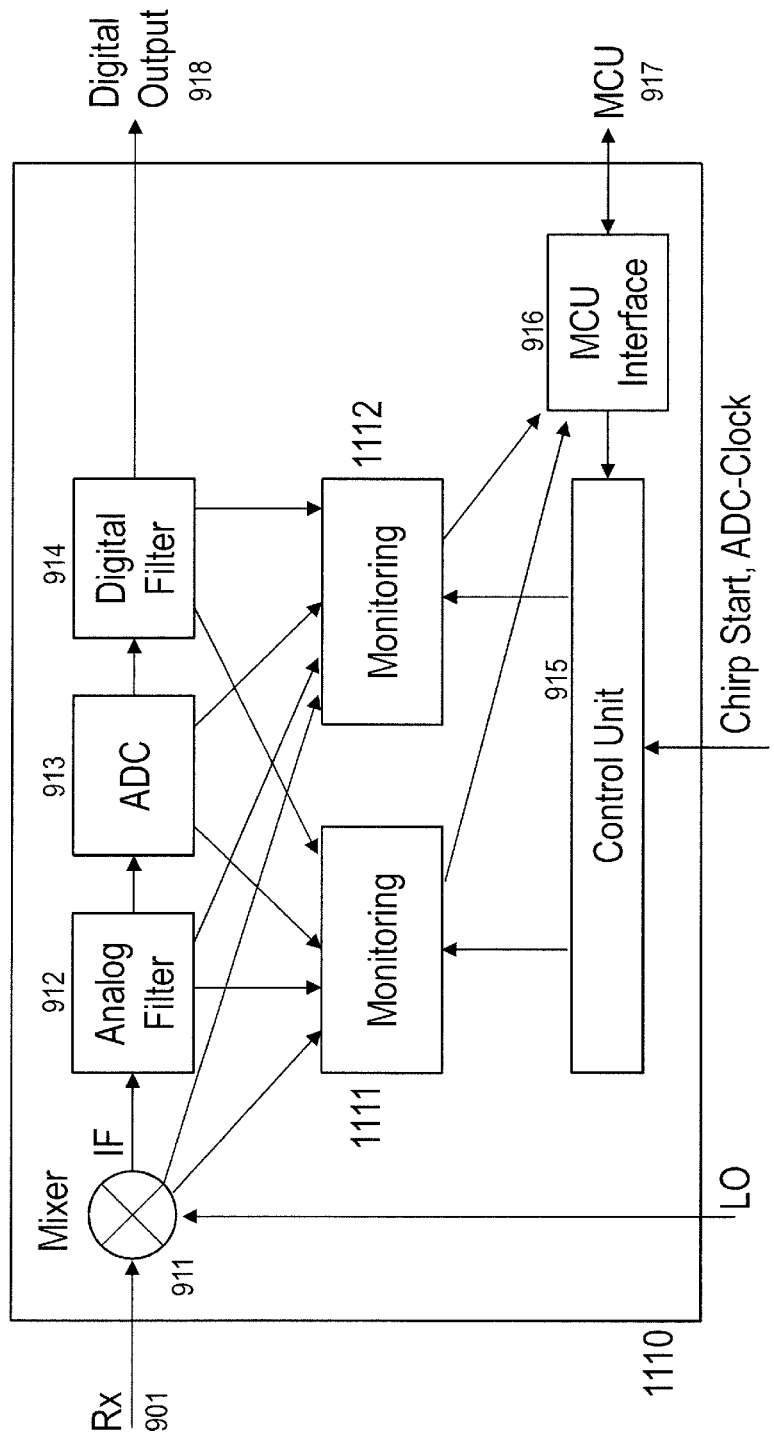
FIG. 9 shows an example MMIC architecture comprising a receiver.

FIG. 9 shows an MMIC comprising a receiver 1110, which is based on the receiver shown and described with regard to FIG. 1A. In contrast to FIG. 1A, the receiver 1110 comprises a monitoring unit 1111 and a monitoring unit 1112.

The mixer 911, the analog filter 912, the ADC 913, the digital filter 914 as well as the control unit 915 are connected to the monitoring unit 1111. The monitoring unit 1111 is connected to the MCU interface 916. The monitoring unit 1111 is associated with the first set of virtual chirps.

The mixer 911, the analog filter 912, the ADC 913, the digital filter 914 as well as the control unit 915 are connected to the monitoring unit 1112. The monitoring unit 1112 is connected to the MCU interface 916. The monitoring unit 1112 is associated with the second set of virtual chirps.

It is noted that for clarity reasons FIG. 9 does not show the control lines towards the mixer 911, the analog filter 912, the ADC 913 and the digital filter 914. In this regard, reference is made to FIG. 1A above.

The MMIC according to FIG. 9 supports independency between the data of the first set of virtual chirps form the data of the second set of virtual chirps. Processing the sets of virtual chirps independently from each other enables a reduction of the reaction time of the radar system.

The monitoring units 1111 and 1112 may have the same physical structure.

The control unit 915 may activate the monitoring unit 1111 during the time when the first set of virtual chirps is processed and the monitoring unit 1112 during the time when the second set of virtual chirps is processed.

This approach may be applicable for more than two sets of virtual chirps by supplying more than two monitoring units.

An example for the operation of one of the monitoring units 1111 or 1112 is as follows: The monitoring unit obtains inputs from the mixer 911. It conducts a signal amplitude detection to detect and/or record whether a signal is too high or too low. A signal being too high bears the risk of a saturation and a signal being too low bears the risk of poor recognition. A comparison with thresholds may be conducted to determine whether the signal is either too high or too low.

Also, input from other components, i.e. the analog filter 912, the ADC 913 and/or the digital filter 914 can be obtained and compared to thresholds or recorded values.

As a result, changing the configuration during runtime. For this purpose, the information collected may be conveyed from the monitoring unit(s) to the MCU 917 via the MCU interface 916. The MCU 917 may then adjust the configuration of the mixer 911, the analog filter 912, the ADC 913 and/or the digital filter 914 via the MCU interface 916 and the control unit 915 by utilizing the respective control lines shown in FIG. 1A. This allows adjusting the configuration during runtime.

MIMIC for Several Receiving Channels

Figure 10:
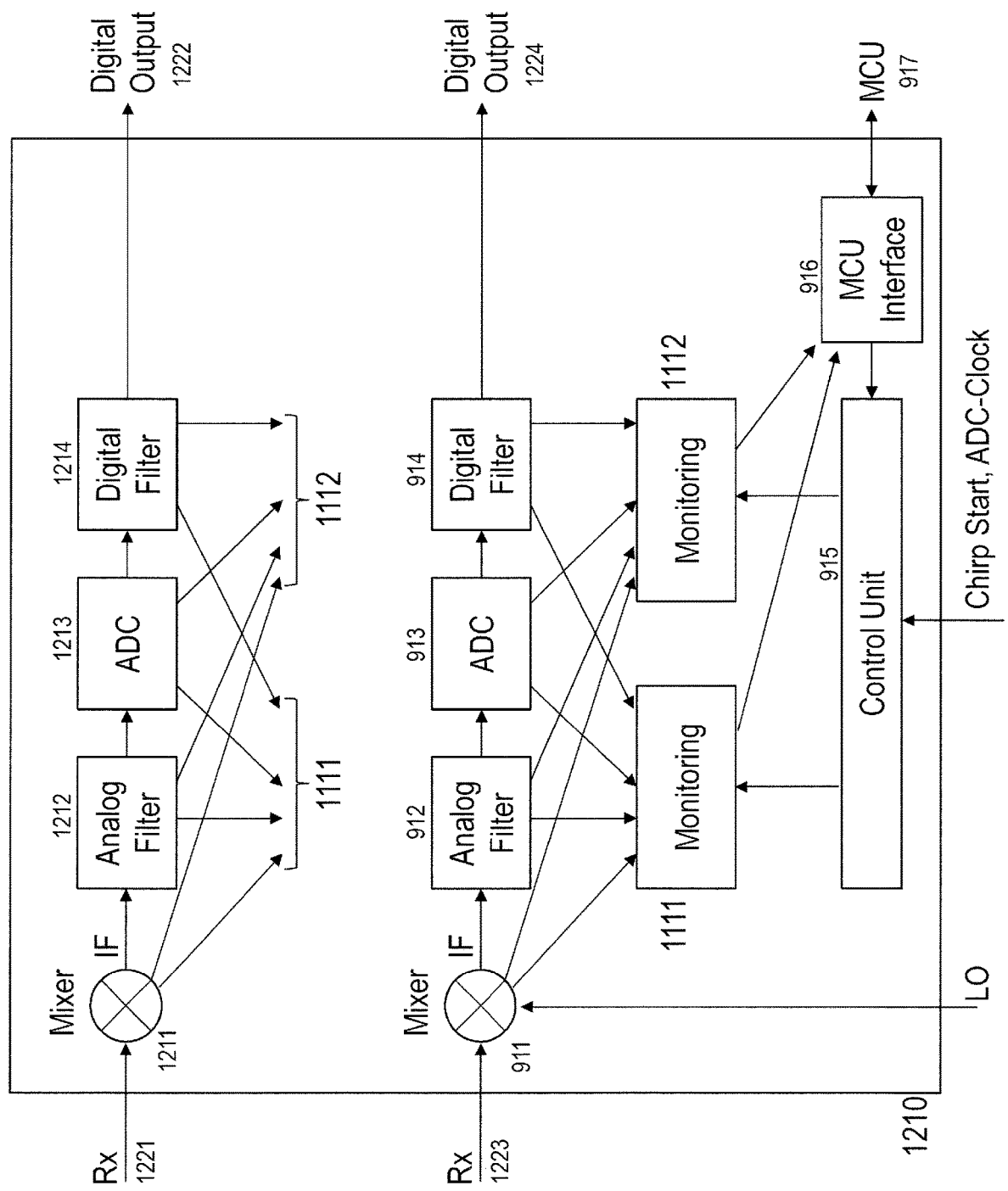
FIG. 10 shows an alternative MMIC architecture with a receiver capable of receiving two signals.

FIG. 10 is based on the MMIC architecture shown in FIG. 9. In FIG. 10 an MMIC comprises a receiver 1210 with two receiving channels. A first received signal 1223 is fed to the receiver as shown in FIG. 9 providing a digital output 1224.

In addition, a second received signal 1221 is fed to a receiver comprising a mixer 1211, an analog filter 1212, an ADC 1213 and a digital filter 1214. The operation is similar to the one described, e.g., with regard to FIG. 1A. This portion provides a digital output 1222.

The mixer 1211, the analog filter 1212, the ADC 1213 and the digital filter 1214 are also connected to the monitoring unit 1111 and to the monitoring unit 1112.

Also, the control lines towards the mixer 1211, the analog filter 1212, the ADC 1213 and the digital filter 1214 are not shown solely for clarity reasons. However, these components can be controlled by the control unit as, e.g., shown in and explained with regard to FIG. 1A above.

It is noted that FIG. 10 shows two receiving channels. This approach can be used for more than two receiving channels accordingly.

The architecture of FIG. 10 bears the advantage that the independency between processing of data of the first set of virtual chirps from data of the second set of virtual chirps may be further increased.

Applying the architecture of FIG. 10 to the flow chart of FIG. 6 the following may apply: The block 601 may be separated into a block for determining the samples of the first set of virtual chirps and a block for determining the samples of the second set of virtual chirps.

Also, the block 604 may then comprise a radar signal processing of the first set of virtual chirps based on the received signals 1221 and 1223. A range Doppler map may then be computed based on the received signal 1221 and an FFT peak selection may be done using the range/Doppler map.

Accordingly, the block 605 may then comprise a radar signal processing of the second set of virtual chirps based on the received signals 1221 and 1223. A range Doppler map may then be computed based on the received signal 1223 and an FFT peak selection may be done using the range/Doppler map.

Hence, an independency between two computations flows in the second mode can be further enhanced so that, for the first set of virtual chirps, FFT peak selection is done by only using the Range/Doppler map computed on the received signal 1221 and for the second set of virtual chirps, FFT peak selection is done by only using the Range/Doppler map computed on the received signal 1223.

Advantages and Further Aspects

Hence, the solution presented allows using a single acquisition (received signals) to be treated as several (e.g., two) separate acquisition by virtualizing the samples of the received signals into several (e.g., two) different sets of virtual chirps.

It is noted that the two sets of virtual chirps are merely an example. It is also an option that more than two sets of virtual chirps are determined, i.e. derived from the physical base chirp.

Based on two sets of virtual chirps, the reaction time of the radar system is improved, i.e. the radar system is able to react faster. The shortened reaction time enables reducing the probability of an object not being detected and/or the probability of a false detection.

This solution copes with a single physical acquisition using, e.g., a single radar transmitter and receiver. However, several physical acquisitions can be used in combination with the solution described herein. For example, for each physical acquisition, at least two sets of virtual chirps may be determined and used for further processing of the radar signals.

The solution described herein may be used in radar systems that may in particular be arranged in vehicles.

Such radar system may be used for several levels of (partial or full) automated driving. This approach enables recognizing targets earlier thereby allowing the automated vehicle (a control unit of the automated vehicle) to make a better, well-informed decision. The automated vehicle can even decide to still observe the target for some time before the actual decision (e.g., triggering an emergency break and/or evasive maneuver) is taken.

It is noted that a vehicle may comprise several radar systems or that a radar system may utilize several subsystems that may in particular allow detecting targets in various directions (e.g., front, back, left, right, up, down).

The interference mitigation reduces the probability of the radar system to be disturbed.

Due to the performance of the radar system (fast determination of targets utilizing the several sets of virtual chirps) a detection of an object or target can be confirmed before an actual measurement is triggered.

Also, the approach presented herein allows combining the chirps from the original physical signal with the sets of virtual chirps. Such combined processing may further improve the recognition quality of the radar system.

As indicated, the reaction time for a radar system or a system utilizing a radar system is reduced by dividing the physical chirp (data received) into two virtual chirps. However, it is also an option to divide the physical chirp into three or more virtual chirps.

It is also an advantage that a detection of an object can be confirmed by computing a trajectory of known detections. This becomes feasible due to the faster detections, which are based on the virtual chirp concept described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A non-transitory computer program product may include a non-transitory computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various examples have been disclosed, it will be apparent to those skilled in the art that various changes and modifications can be made which will achieve some of the advantages of the description without departing from the spirit and scope of the description. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods described herein may be achieved in either all software implementations, using the appropriate processor instructions, or in hybrid implementations that utilize a combination of hardware logic and software logic to achieve the same results. Such modifications to the description are intended to be covered by the appended claims.

The invention claimed is:

1. A method, comprising:
 receiving, by a device, chirps of a radar signal,
 sampling, by the device, the radar signal to obtain samples of the radar signal that correspond to a chirp of the chirps,
 dividing, by the device, the samples of the radar signal corresponding to the chirp into at least two virtual chirps,
  wherein each virtual chirp, of the at least two virtual chirps, is separated by a time interval from another virtual chirp, of the at least two virtual chirps, wherein a duration of each virtual chirp, of the at least two virtual chirps, is less than 50% of a duration of the chirp, and wherein the duration of the chirp is equal to a sum of durations of the at least two virtual chirps and a duration of the time interval; and processing, by the device, each virtual chirp, of the at least two virtual chirps, as individual chirps.

2. The method according to claim 1, wherein the durations of the at least two virtual chirps are equally spread across the duration of the chirp.

3. The method according to claim 1, wherein a first virtual chirp, of the at least two virtual chirps, corresponds to a first start frequency and a first stop frequency, wherein a second virtual chirp, of the at least two virtual chirps, corresponds to a second start frequency and a second stop frequency, and wherein the first start frequency and the second start frequency are different and the first stop frequency and the second stop frequency are different.

4. The method according to claim 1, wherein the durations of the at least two virtual chirps are not equally spread across the duration of the chirp.

5. The method according to claim 1, wherein an interference mitigation is conducted prior to the processing of the radar signal.

6. The method according to claim 1, wherein, in a first mode, the radar signal is processed based on the chirps of the radar signal, and wherein, in a second mode, the radar signal is processed based on the at least two virtual chirps.

7. The method according to claim 6, wherein the first mode and the second mode are selected subsequently or in parallel.

8. The method according to claim 6, wherein, in the first mode and the second mode, radar signals, that are stored in a commonly accessible memory, are processed.

9. The method according to claim 1, wherein processing each virtual chirp, of the at least two virtual chirps, comprises at least one of:

conducting a Fast Fourier Transform (FFT), conducting an inverse FFT (iFFT), or conducting a Constant false alarm rejection (CFAR).

10. The method according to claim 1, wherein processing each virtual chirp, of the at least two virtual chirps, comprises:

zero-padding at least one virtual chirp of the at least two virtual chirps to enlarge a number of values.

11. The method according to claim 1, wherein processing each virtual chirp, of the at least two virtual chirps, comprises:

summing up pairs of bins in a complex domain for at least one virtual chirp of the at least two virtual chirps.

12. The method according to claim 1, wherein processing each virtual chirp, of the at least two virtual chirps, comprises:

performing a Fast Fourier Transform (FFT) to obtain a first range-doppler map which is based only on samples of a first virtual chirp of the at least two virtual chirps, and performing a FFT to obtain a second range-doppler map which is based only on samples of a second virtual chirp of the at least two virtual chirps.

13. A radar device, comprising:
a receiver configured to:
receive chirps of a radar signal via an antenna; and
a processing unit configured to:
sample the radar signal to obtain samples of the radar signal that correspond to a chirp of the chirps,
divide the samples of the radar signal corresponding to the chirp into at least two virtual chirps,
wherein each virtual chirp, of the at least two virtual chirps, is separated by a time interval from another virtual chirp, of the at least two virtual chirps,
wherein a duration of each virtual chirp, of the at least two virtual chirps, is less than 50% of a duration of the chirp, and
wherein the duration of the chirp is equal to a sum of durations of the at least two virtual chirps and a duration of the time interval, and
process each virtual chirp, of the at least two virtual chirps, as individual chirps.

14. The radar device according to claim 13, wherein the processing unit is further configured to:
trigger a predetermined action based on the processing satisfying a predetermined condition.

15. The radar device according to claim 13, wherein the receiver is further configured to:
enable independent virtual chirps by having redundant hardware resources,
wherein at least one hardware resource, of the redundant hardware resources, is activated during a part of one of the independent virtual chirps.

16. The radar device according to claim 13, wherein the radar device is integrated on a single monolithic microwave integrated circuit (MIMIC).

17. The radar device according to claim 13, further comprising:
a transmitter,
wherein a combination of the receiver and the transmitter is arranged to enable independent virtual chirps by having redundant hardware resources,
wherein at least one hardware resource, of the redundant hardware resources, is activated during a part of one of the independent virtual chirps.

18. A vehicle comprising the radar device according to claim 13.

19. A non-transitory computer-readable medium storing instructions, the instructions comprising:
one or more instructions that, when executed by one or more processors of a device, cause the device to:
receive chirps of a radar signal,
sample the radar signal to obtain samples of the radar signal that correspond to a chirp of the chirps,
divide the samples of the radar signal corresponding to the chirp into at least two virtual chirps,
wherein each virtual chirp, of the at least two virtual chirps, is separated by a time interval from another virtual chirp, of the at least two virtual chirps,
wherein a duration of each virtual chirp, of the at least two virtual chirps, is less than 50% of a duration of the chirp, and
wherein the duration of the chirp is equal to a sum of durations of the at least two virtual chirps and a duration of the time interval, and
process each virtual chirp, of the at least two virtual chirps, as individual chirps.

20. The non-transitory computer-readable medium of claim 19, wherein the one or more instructions further cause the device to:

trigger a predetermined action based on the processing satisfying a predetermined condition.

21. The non-transitory computer-readable medium of claim 19, wherein a first virtual chirp, of the at least two virtual chirps, corresponds to a first start frequency and a first stop frequency, wherein a second virtual chirp, of the at least two virtual chirps, corresponds to a second start frequency and a second stop frequency, and wherein the first start frequency and the second start frequency are different and the first stop frequency and the second stop frequency are different.

* * * * *